(12) United States Patent
Zhang et al.

(10) Patent No.: US 12,134,485 B2
(45) Date of Patent: Nov. 5, 2024

(54) METHOD OF FLYING ON THE MOON AND A DEVICE FOR FLYING ON THE MOON

(71) Applicant: NINGBO INSTITUTE OF MATERIALS TECHNOLOGY & ENGINEERING CHINESE ACADEMY OF SCIENCES, Zhejiang (CN)

(72) Inventors: Wenwu Zhang, Zhejiang (CN); Yufeng Wang, Zhejiang (CN)

(73) Assignee: Ningbo Institute of Materials Technology & Engineering Chinese Academy of Sciences, Ningbo (CN)

( * ) Notice: Subject to any disclaimer, the term of this patent is extended or adjusted under 35 U.S.C. 154(b) by 349 days.

(21) Appl. No.: 17/427,529

(22) PCT Filed: May 8, 2019

(86) PCT No.: PCT/CN2019/085934
§ 371 (c)(1),
(2) Date: Jul. 30, 2021

(87) PCT Pub. No.: WO2020/155460
PCT Pub. Date: Aug. 6, 2020

(65) Prior Publication Data
US 2022/0135257 A1 May 5, 2022

(30) Foreign Application Priority Data
Feb. 2, 2019 (CN) .......................... 201910107832.6

(51) Int. Cl.
*B64G 1/40* (2006.01)
*B64G 1/42* (2006.01)
(Continued)

(52) U.S. Cl.
CPC .............. *B64G 1/409* (2013.01); *B64G 1/425* (2013.01); *B64G 1/443* (2013.01); *B64G 1/66* (2013.01)

(58) Field of Classification Search
CPC ........ B64G 1/409; B64G 1/425; B64G 1/443; B64G 1/66; B64G 1/002; B64G 1/422;
(Continued)

(56) References Cited

U.S. PATENT DOCUMENTS 3,700,172 A    10/1972   Gallegos, Sr.
4,541,357 A     9/1985   Stanton
(Continued)

FOREIGN PATENT DOCUMENTS

CN      1037192 A     11/1989
CN    101725432 A      6/2010
(Continued)

OTHER PUBLICATIONS

Saito et al, Development of the Powdered Propellant Propulsion System, Jul. 2007, AIAA, (Year: 2007).*
(Continued)

*Primary Examiner* — Medhat Badawi
*Assistant Examiner* — Vicente Rodriguez
(74) *Attorney, Agent, or Firm* — Holzer Patel Drennan

(57) ABSTRACT

Disclosed are a method of flying on the moon and a device for flying using the method. A medium on a surface of a moon and a medium accelerating module are used in the flying method. The medium is transferred into the medium accelerating module, accelerated by the medium accelerating module, and ejected out of the medium accelerating module by using a power supply. A counterforce is generated in accordance with the momentum conservation, and the counterforce overcomes the lunar gravity and drives a load to take off. The method is suitable for the environment of the
(Continued)

flight direction moon where flight by means of atmospheric buoyancy is impossible due to the shortage of atmosphere.

15 Claims, 6 Drawing Sheets

(51) Int. Cl.
*B64G 1/44* (2006.01)
*B64G 1/66* (2006.01)

(58) Field of Classification Search
CPC .......... B64G 1/10; B64G 1/1071; B64G 1/16; B64G 1/401; B64G 1/403; B64G 99/00; B64G 1/408; B64G 2004/005; B64G 1/40; E21C 51/00; F05D 2210/10; F02K 99/00

See application file for complete search history.

(56) References Cited

U.S. PATENT DOCUMENTS

| | | | | |
|---|---|---|---|---|
| 5,223,781 A * | 6/1993 | Criswell | ................ | B64G 1/428 |
| | | | | 290/1 R |
| 5,417,547 A * | 5/1995 | Harada | ................ | F04D 29/448 |
| | | | | 415/208.4 |
| 6,093,076 A * | 7/2000 | Street | ................ | A63H 23/12 |
| | | | | 446/156 |
| 6,419,538 B1 * | 7/2002 | Diaz | ................ | H05H 1/24 |
| | | | | 60/202 |
| 2002/0134399 A1 | 9/2002 | Taylor | | |
| 2004/0004184 A1 | 1/2004 | Schubert | | |
| 2007/0044450 A1 * | 3/2007 | Kuninaka | ............ | B64G 1/403 |
| | | | | 60/200.1 |
| 2008/0023587 A1 * | 1/2008 | Head | ................ | B64G 1/10 |
| | | | | 244/171.1 |
| 2009/0206204 A1 * | 8/2009 | Rosen | ................ | B64G 1/62 |
| | | | | 244/171.1 |
| 2010/0193640 A1 | 8/2010 | Atmur et al. | | |
| 2015/0240794 A1 | 8/2015 | Berl | | |

FOREIGN PATENT DOCUMENTS

| | | |
|---|---|---|
| CN | 102085916 A | 6/2011 |
| CN | 104743113 A | 7/2015 |
| CN | 105383694 A | 3/2016 |
| CN | 205602155 U | 9/2016 |
| CN | 108032967 A | 5/2018 |
| CN | 108839807 A | 11/2018 |
| EP | 1526073 A1 | 4/2005 |
| JP | H0656100 A | 3/1994 |
| JP | 2004108374 A | 4/2004 |
| RU | 2644798 C1 | 2/2018 |
| WO | 2014027927 A2 | 2/2014 |
| WO | 2016147032 A1 | 9/2016 |
| WO | 2018030366 A1 | 2/2018 |
| WO | 2018030367 A1 | 2/2018 |
| WO | 2018049153 A1 | 3/2018 |

OTHER PUBLICATIONS

Hepp et al, Production and use of metals and oxygen for lunar propulsion, Sep. 1991, AIAA, (Year: 1991).*
Menich, Ronal P., Powering cislunar spaceflight with NEO powder, Oct. 20, 2014, The Space Review, https://www.thespacereview.com, (Year: 2014).*
International Search Report completed by the China National Intellectual Property Administration on Oct. 29, 2019 for Application PCT/2019/085934.
P. 357 of Article "Power System" in "Cosmonautics. Encyclopedia." edited by Chief Editor V. P. Glushko. published by Publishing House 'Soviet Encyclopedia' in Moscow in 1986.
Pp. 304-308 of Article "Pump" in the Part 2, vol. 17, 3rd Edition of "BSE" edited by Chief Editor A. M. Prokhorov. published by Publishing House 'Soviet Encyclopedia' in Moscow in 1974.

* cited by examiner

METHOD OF FLYING ON THE MOON AND A DEVICE FOR FLYING ON THE MOON

CROSS-REFERENCE TO RELATED APPLICATIONS

The present application is a U.S. national stage entry of PCT Application No. PCT/CN2019/085934, entitled "METHOD FOR FLIGHT ON MOON AND LUNAR FLIGHT DEVICE," and filed on May 8, 2019, which is incorporated by reference herein for all that it discloses or teaches. The present application claims further benefit of priority to Chinese Application No. 201910107832.6, which was filed Feb. 2, 2019, and is also incorporated by reference herein for all that it discloses or teaches.

TECHNICAL FIELD

The present disclosure relates to a technical field of flight technology, and in particular, relates to a method of flying on a moon and a device for flying on a moon.

BACKGROUND ART

Unlike the Earth, which has a dense atmosphere, the moon has no atmosphere on the surface thereof, thus it is impossible to fly on the moon by means of atmospheric buoyancy.

At present, the landing and return to the moon mainly depend on the principle of the rocket, that is, the aircraft itself carries reaction materials, and chemical reactions of the reaction materials generate a medium impulse, so as to overcome the gravity constraint. However, due to limited rocket fuels, it is difficult to use the rocket fuels in the environment of the moon for a long time. Besides, other propulsion methods, such as electric propulsion, plasma propulsion, etc., require a large auxiliary energy, structure, and medium consumption, thus it is more difficult to solve the flight problem. Therefore, the exploration to the moon after landing is mainly realized by an electric driving wheel actuating device, in which the wheel is driven to rotate by an on-board electric power, to realize the movement on the surface of the moon.

However, due to the softness of the soil in many areas on the surface of the moon (i.e., the lunar soil), the movement on the surface of the moon shall overcome a relatively larger resistance, especially when encountering complex landforms, the electric driving wheel actuating device is prone to accidents. In addition, for steep or high topography, the electric driving wheel actuating device cannot observe and sample nearby. Therefore, the exploration and investigation of the moon faces great difficulties.

SUMMARY OF THE INVENTION

In view of the above-mentioned technical problem, the present disclosure provides a method of flying on the moon, which can realize flight on the moon, thus breaking through the obstacles of the surface morphology of the moon to scientific investigation, and expanding human's ability to explore and exploit the moon.

According to an aspect, the present disclosure provides a method of flying on the moon, which uses a medium on the moon and a medium accelerating module. The method comprising: by using a power supply, transferring the medium into the medium accelerating module, accelerating the medium by the medium accelerating module and ejecting the medium out of the medium accelerating module, wherein a counterforce is generated in accordance with the momentum conservation, and the counterforce overcomes a lunar gravity and drives a load to take off.

The medium includes a solid medium, such as soil, gravel, rock, which are sufficient resources on the planet, and a fluid medium, such as water resources on the moon.

A method of obtaining the medium is not limited. The medium may be obtained by a medium obtaining unit, and the medium obtaining unit may be, for example, a combination of one or more of a mechanical gripper, a belt retractor, a suction pipe, etc.

The medium accelerating module is not limited. The medium accelerating module may be a device that converts electric energy into mechanical motion, such as a device composed of a driving unit (for example, a motor, etc.) and a rotating unit (for example, a blade, an impeller, etc.). The driving unit drives the rotating unit to rotate by using the power supply, the medium is transferred to the rotating unit, and the medium is accelerated by the rotating unit and ejected outside. The medium accelerating module may also be an electromagnetic device. For example, the medium is polarized and then input into the electromagnetic device, and the medium is accelerated and ejected out of the electromagnetic device by using an electromagnetic field.

When the medium accelerating module operates, the way for supplying power is not limited, and one or more of a generator, a storage battery, a remote energy transmission power supply, a build-in nuclear battery, etc. may be used.

The generator includes but is not limited to a fuel generator. On the earth, it may be an oil-fired internal combustion engine, with oxygen taken from the atmosphere; on the moon, it may be a configuration similar as a rocket engine, which uses fuel and oxidant, for example, a mixture of kerosene and oxygen. The advantage of the generator is that the power can be expanded as needed to achieve heavy load flight. Solar energy is an available resource on the moon, thus, the generator may use solar energy and convert it into electric energy as a power supply unit in the present disclosure. As an implementation, a solar panel is provided on the device for flying, and the solar panel may receive solar energy and convert it into electric energy.

The storage battery may be charged through a power station, for example, may be charged through a solar power station on the moon or other types of power stations.

The storage battery may be charged through a power station, the power station includes a solar power station or other types of power stations, and may be charged through a solar panel provided on the device for flying.

The remote energy transmission power supply transmits energy remotely, for example, the electromagnetic wave transmits energy (including microwave, light energy, etc.) in a long distance and then converts it into electric energy.

The build-in nuclear battery may provide electricity for a long time.

During the flight, the medium is continuously consumed. As an implementation, the method further comprises: landing before the medium is exhausted; and taking off again after the medium is reloaded.

The method of transfer the medium to the medium accelerating module is not limited, and the method may be a free fall, transmission (such as conveyor belt transmission), or vibration.

When the medium accelerating module includes a driving unit and a rotating unit, in order to reduce impact wear, the rotating unit preferably uses lightweight materials. Preferably, a wear-resistant coating, such as a diamond coating, is provided on a surface of the rotating unit. In addition, the stress experienced by the rotating unit during high-speed rotation is lower than its ultimate yield stress.

The magnitude of the counterforce determines the magnitude of the load mass that can take off. The magnitude of the counterforce is related to the parameters such as the diameter (m) and the rotating speed (rpm) of the rotating unit, and the mass flow rate (Kg/s) of the ejected medium etc. That is, when other conditions are constant, the magnitude of the counterforce may be determined by determining the diameter (m) and the rotating speed (rpm) of the rotating unit, and the mass flow rate (Kg/s) of the ejected medium, thereby determining the load mass that can take off. When the mass flow rate of the ejected medium is constant and other conditions are constant, the counterforce is proportional to the diameter (m) and the rotating speed (rpm) of the rotating unit.

For example, the following table shows the counterforce achieved by driving the blade using a high-speed motor, and the maximum mass for take-off on the moon.

| Diameter of the rotating unit (m) | Rotating speed of the rotating unit (rpm) | Speed for ejecting the lunar soil (m/s) | Mass flow rate of the ejected lunar soil (Kg/s) | Counterforce (N) | Maximum mass for take-off on the moon (Kg) |
|---|---|---|---|---|---|
| 0.10 | 36000 | 188.50 | 0.10 | 18.85 | 11.54 |
| 0.10 | 75000 | 392.70 | 0.10 | 39.27 | 24.04 |
| 0.20 | 36000 | 376.99 | 0.10 | 37.70 | 23.08 |
| 0.20 | 75000 | 785.40 | 0.10 | 78.54 | 48.09 |
| 0.40 | 36000 | 753.98 | 0.10 | 75.40 | 46.16 |
| 0.40 | 75000 | 1570.80 | 0.10 | 157.08 | 96.17 |

It can be seen from the above table that, when the mass flow rate of the ejected lunar soil is set to 0.1 Kg/s, using an impeller with a diameter of 100 mm at the rotating speed of 75000 rpm, the speed for ejecting of the lunar soil is 392.7 m/s, and a counterforce of about 39N is arrived. As the gravity constant of the moon is about $\frac{1}{6}$ of that of the earth, thus the load mass that can be driven by the counterforce to take off is about 24 Kg. Under the same conditions, using an impeller with a diameter of 200 mm, 48 Kg-level load to take off is realized, and using an impeller with a diameter of 400 mm, 96 Kg-level load to take off is realized. As the high-speed motor may drive the blade to arrive a rotating speed of 10000-600000 rpm, so that the load mass that can be driven to take off is very large.

According to another aspect, the present disclosure provides a device for flying on the moon, including a power supply, a medium accelerating module, and a medium storage unit.

In the operating state, the power supply supplies electric power to the medium accelerating module, a medium is transferred from the medium storage unit to the medium accelerating module, and is accelerated by the medium accelerating module and ejected out of the medium accelerating module to generate a counterforce, and wherein the counterforce overcomes a lunar gravity, and the device for flying on the moon is driven to take off.

Preferably, the device for flying on the moon further includes an ejecting unit, and the medium is ejected out of the medium accelerating module through the ejecting unit. More preferably, the ejecting unit includes a first ejecting unit and a second ejecting unit, a counterforce generated by the medium accelerated and ejected out through the first ejecting unit overcomes the lunar gravity, and a counterforce generated by the medium ejected out through the second ejecting unit controls a flight direction of the device for flying on the moon. More preferably, the first ejecting unit is disposed on a bottom of the device for flying on the moon, and the second ejecting unit is disposed on a side of the device for flying on the moon.

The power supply may be a generator or a storage battery.

The generator includes but is not limited to a rocket engine that uses fuel and oxidant. The advantage of the generator is that the power can be expanded as needed to achieve heavy load flight. Solar energy is an available resource on the moon, thus, the generator may use solar energy and convert it into electric energy as a power supply unit in the present disclosure. As an implementation, a solar panel is provided on the device for flying on the moon, and the solar panel may receive solar energy and convert it into electric energy.

The storage battery may be charged by solar energy, for example, may be charged through a solar power station on the moon, or may be charged through a solar panel provided on the device for flying on the moon.

Preferably, the device for flying on the moon further includes a detector for detecting, investigating, researching and other purposes.

Preferably, the device for flying on the moon further includes a transceiver for communication.

Preferably, the device for flying on the moon further includes a controller for coordinating and controlling the entire device for flying on the moon.

The present disclosure provides a new method of flying on the moon. Since there is no atmosphere on the moon, it is impossible to fly by means of atmospheric buoyancy. The present disclosure uses the medium existed on the moon, which is ejected out of the medium accelerating module after being accelerated by the medium accelerating module and returns to the moon again, and generates a counterforce in accordance with the momentum conservation to overcome the lunar gravity, so as to achieve the purpose of flight, thereby breaking through the obstacles of the surface morphology of the moon to scientific investigation, and expanding human's ability to explore, investigate, and exploit the moon.

DETAILED DESCRIPTION OF THE EMBODIMENTS

Figure 1:
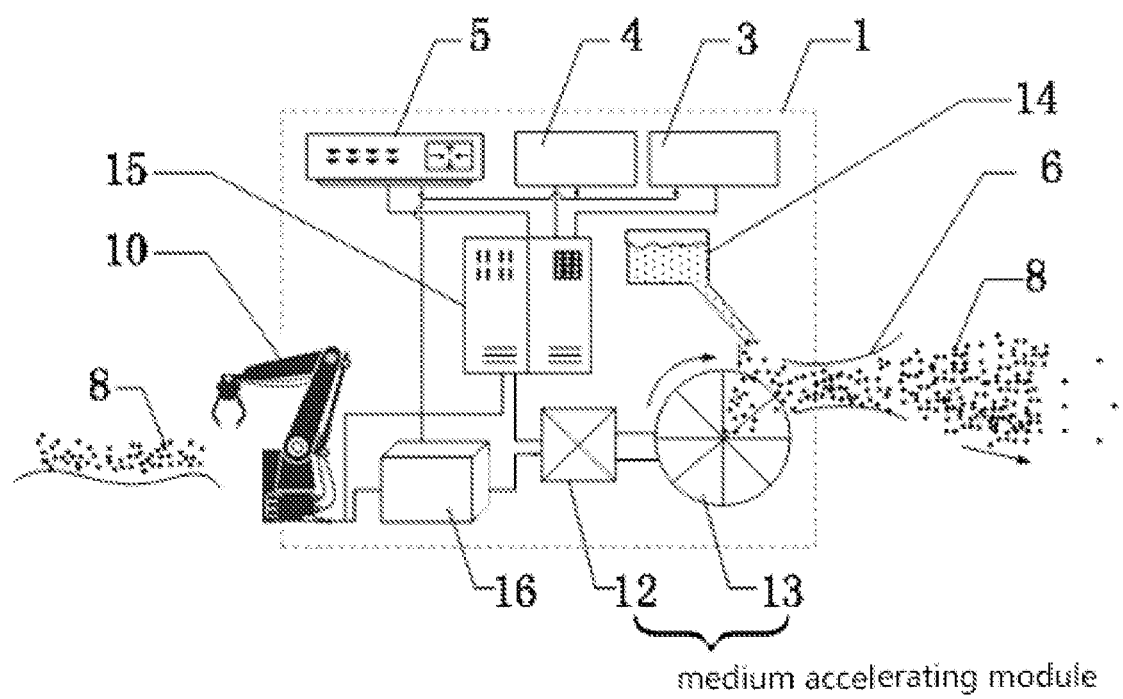
FIG. 1 is a schematic view of a structure of a device for flying on the moon in embodiment 1 of the present disclosure.

The present disclosure will be further described in detail below in conjunction with the embodiments. It should be pointed out that the following embodiments are intended to facilitate the understanding of the present disclosure without any limiting effect.

Reference numerals in FIGS. 1-6 are as follows:
1: aircraft body; 2: solar panel; 3: detector A; 4: detector B; 5: transceiver; 6: nozzle; 7: first nozzle; 8: lunar soil; 9: solar power station; 10: lunar soil grabbing and filtering device; 11: power supply; 12: high-speed motor; 13: impeller; 14: lunar soil storage container; 15: central processing unit; 16: power generation device; 17: second nozzle; 19: support wheel.

Embodiment 1

As illustrated in FIG. 1, a device for flying on the moon includes an aircraft body 1, and the aircraft body 1 includes a power supply 16, a high-speed motor 12, an impeller 13, and a lunar soil storage container 14.

In the operating state, the power supply 16 supplies electric power to the high-speed motor 12, the high-speed motor 12 drives the impeller 13 to rotate at a high speed. The lunar soil 8 falls from the lunar soil storage container 14 to the impeller 13, is accelerated by the high-speed rotating impeller 13, and is ejected out through a nozzle 6, and a generated counterforce overcomes the lunar gravity and drives the device for flying to take off on the surface of the moon.

The device for flying further includes a detector A 3 and a detector B 4 for detecting and researching.

The device for flying further includes a transceiver 5 for communication.

The device for flying further includes a central controller 15 for coordinating and controlling the entire device for flying.

In this embodiment, the lunar soil 8 is grabbed into the lunar soil storage container 14 from the outside of the device for flying by a lunar soil grabbing and filtering device 10. The amount of the lunar soil in the lunar soil storage container 14 is 30 Kg, the mass flow rate of the ejected lunar soil 8 is 0.1 Kg/s, and there may be arrive a 300-second flight, which can meet certain requirements for scientific exploration and engineering.

Before the lunar soil 8 is exhausted, the device for flying achieves a soft landing, loads the lunar soil 8 by the lunar soil grabbing and filtering device 10, and then takes off again.

Embodiment 2

Figure 2:
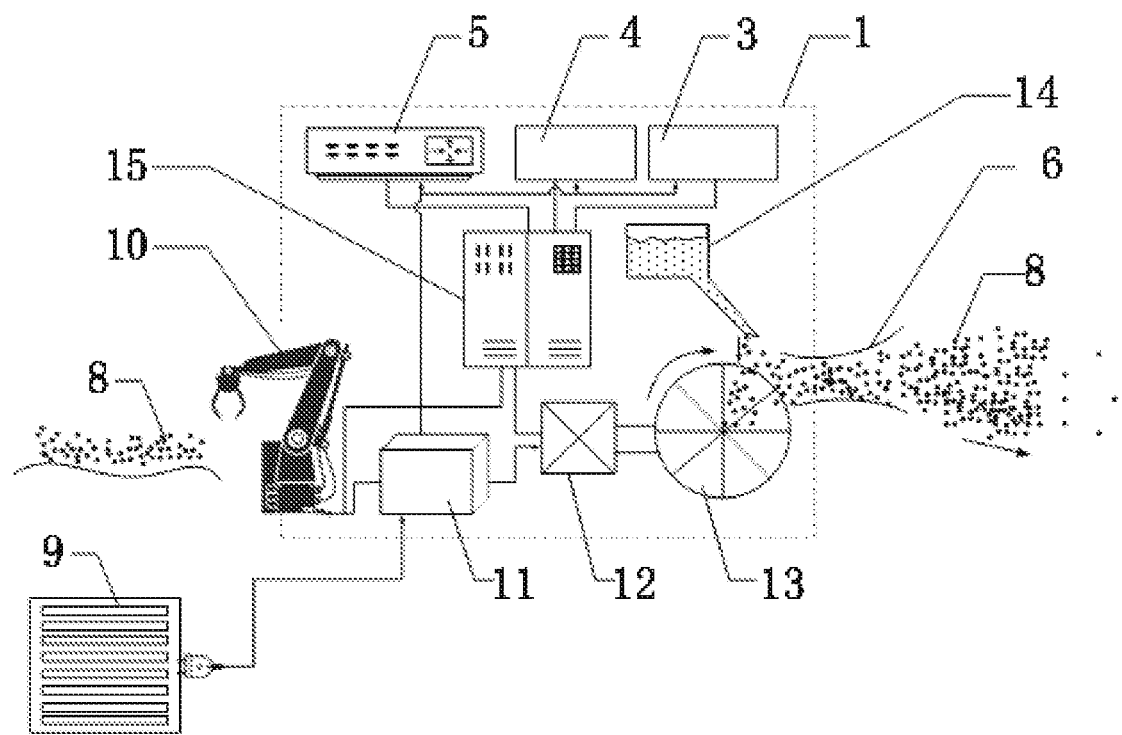
FIG. 2 is a schematic view of a structure of a device for flying on the moon in embodiment 2 of the present disclosure.
Figure 3:
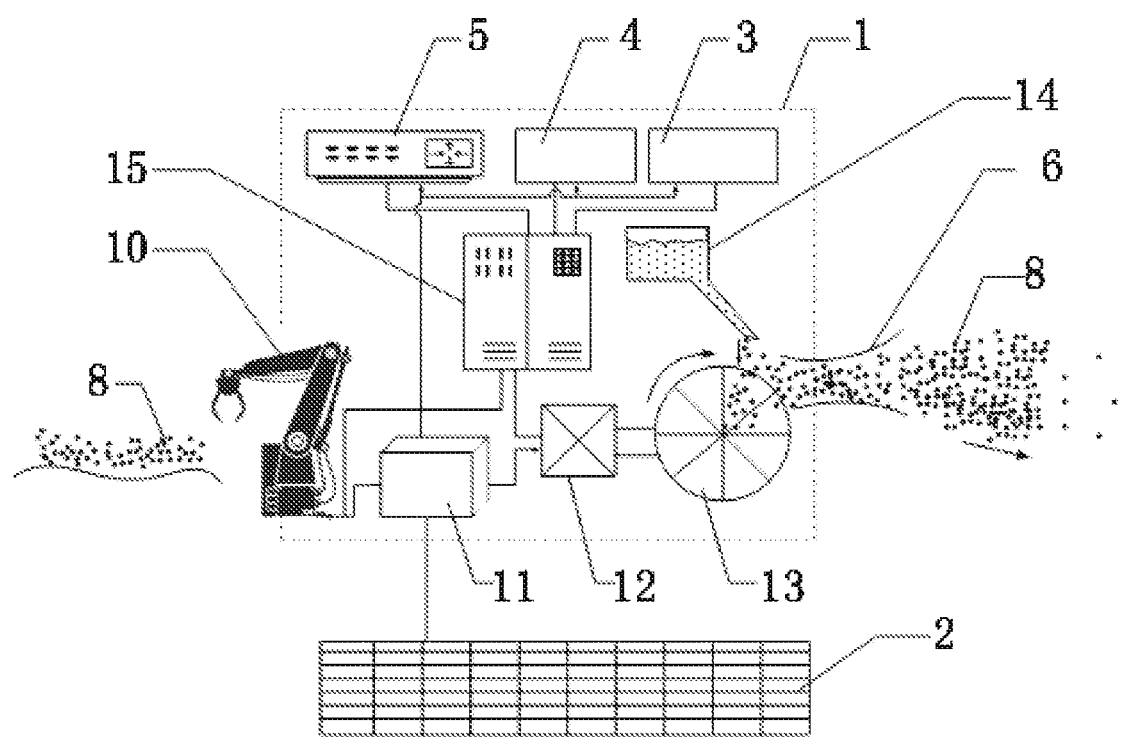
FIG. 3 is a schematic view of a structure of a device for flying on the moon in embodiment 3 of the present disclosure.

As illustrated in FIG. 2, a device for flying on the moon includes an aircraft body 1, and the aircraft body 1 includes a power supply 11, a high-speed motor 12, an impeller 13, and a lunar soil storage container 14.

In the operating state, the power supply 11 supplies electric power to the high-speed motor 12, the high-speed motor 12 drives the impeller 13 to rotate at a high speed. The lunar soil 8 falls from the lunar soil storage container 14 to the impeller 13, is accelerated by the high-speed rotating impeller 13, and is ejected out through a nozzle 6, and a generated counterforce overcomes the lunar gravity and drives the device for flying to take off on the surface of the moon.

In this embodiment, the power supply 11 is a storage battery, and the on-board storage battery may be quickly charged by a lunar solar power station 9 when necessary.

In addition, in this embodiment, the lunar soil 8 is grabbed into the lunar soil storage container 14 from the outside of the device for flying by a lunar soil grabbing and filtering device 10. Before the lunar soil 8 is exhausted, the device for flying achieves a soft landing, loads the lunar soil 8 by the lunar soil grabbing and filtering device 10, and then takes off again.

The device for flying further includes a detector A 3 and a detector B 4 for detecting and researching.

The device for flying further includes a transceiver 5 for communication.

The device for flying further includes a central controller 15 for coordinating and controlling the entire device for flying.

Embodiment 3

In this embodiment, the structure of the device for flying on the moon is basically the same as that of the embodiment 2, except that the solar power station 9 is replaced by a solar panel 2, the solar panel 2 is disposed on the device for flying, thus, when the power is insufficient, the device for flying charges the storage battery 11 through the solar panel 2.

In this embodiment, the flight method of the device for flying is the same as that in the embodiment 1.

Embodiment 4

Figure 4:
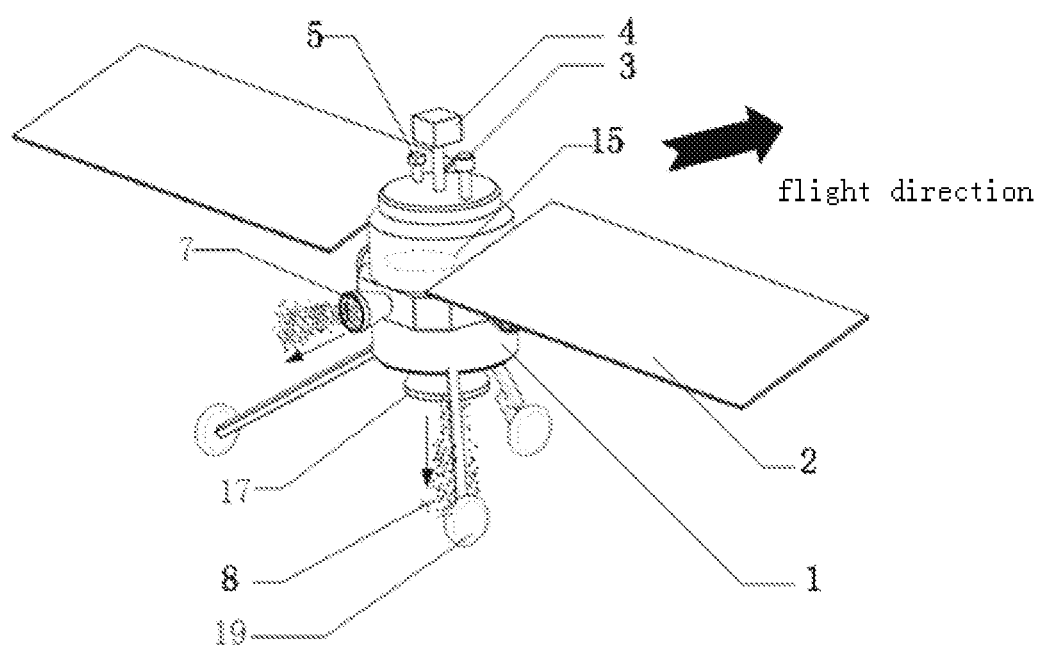
FIG. 4 is a schematic view of a structure of a device for flying on the moon in embodiment 4 of the present disclosure.

In this embodiment, as illustrated in FIG. 4, a device for flying on the moon includes an aircraft body 1, and the aircraft body 1 includes a high-speed motor, an impeller, and a lunar soil storage container.

Two solar panels 2 are disposed on both sides of the aircraft body 1. Since there is no atmospheric resistance on the moon, the solar panels may be installed on the upper part of the aircraft to provide electric energy to the high-speed motor.

Marked-up: In the operating state, the solar panel 2 supplies electric power to the high-speed motor, the high-speed motor drives the impeller to rotate at a high speed. The lunar soil 8 falls from the lunar soil storage container to the impeller, is accelerated by the high-speed rotating impeller, and is ejected out through a first nozzle 7 and a second nozzle 17. The first nozzle 7 is disposed on the side surface of the aircraft body 1, a counterforce generated by the ejected lunar soil is used to control the flight direction; the second nozzle 17 is disposed on the bottom surface of the aircraft body 1, a counterforce generated by the ejected lunar soil is used to overcome the lunar gravity.

Marked-up: In this embodiment, the device for flying further includes a support wheel 19, which is disposed on the side of the aircraft body 1, for maintaining the attitude of the device for flying and buffering for take-off and landing.

In addition, in this embodiment, before the lunar soil 8 is exhausted, the device for flying is soft landing, loads the lunar soil 8 and then takes off again.

The device for flying further includes a detector A 3 and a detector B 4 for detecting and researching.

The device for flying further includes a transceiver 5 for communication.

The device for flying further includes a central controller 15 for coordinating and controlling a series of actions of the device for flying including take-off, detection, timely landing and replenishment, etc.

Embodiment 5

Figure 5:
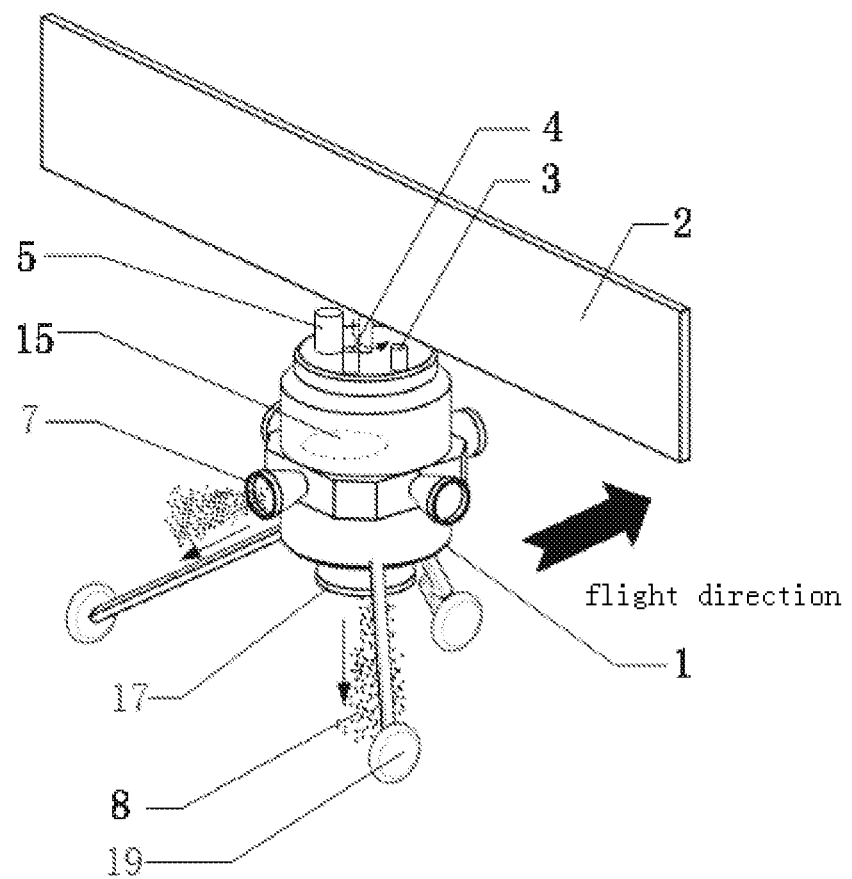
FIG. 5 is a schematic view of a structure of a device for flying on the moon in embodiment 5 of the present disclosure.

In this embodiment, the structure of the device for flying on the moon is basically the same as that of the embodiment 4, except that since there is no atmospheric resistance on the moon, a solar panel 2 is installed on the top of the aircraft body and is vertically disposed, as illustrated in FIG. 5.

In this embodiment, the flight method of the device for flying is the same as that in the embodiment 4.

Embodiment 6

Figure 6:
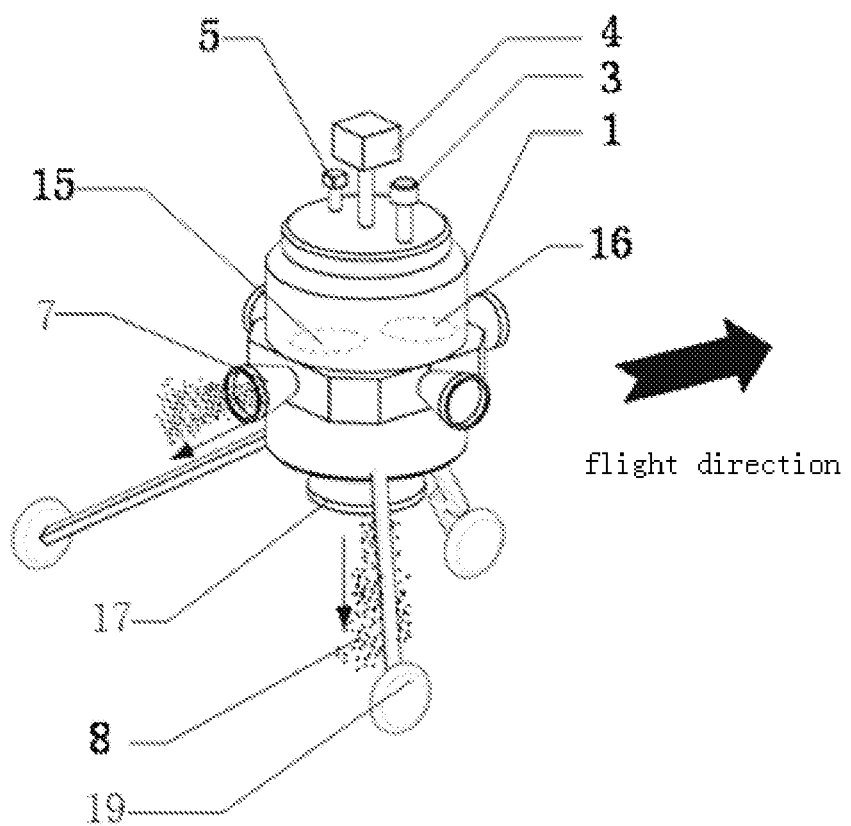
FIG. 6 is a schematic view of a structure of a device for flying on the moon in embodiment 6 of the present disclosure.

In this embodiment, the structure of the device for flying on the moon is basically the same as that of the embodiment 4, except that the solar panel 2 is replaced by a power generation device 16 disposed inside the aircraft body 1, as illustrated in FIG. 6, the power generation device 16 may be a generator, a storage battery, a remote energy transmission power supply, or an build-in nuclear battery, to provide electric energy for the high-speed motor.

The above-mentioned embodiments describe the technical solutions of the present disclosure in detail. It should be understood that the embodiments are only specific embodiments of the present disclosure and are not intended to limit the present disclosure. Any modification, supplement or similar substitution within the scope of the principle of the present disclosure shall be included in the protection scope of the present disclosure.

The invention claimed is:

1. A method of flying on a moon, which uses a medium on the moon, the method comprising:
   by using a power supply, transferring the medium into a medium accelerating module, and accelerating the medium by the medium accelerating module and ejecting the medium out from the medium accelerating module in a force having a direction and a magnitude and without changing a state of the medium, wherein a counterforce is generated in accordance with momentum conservation law with a direction of the counterforce opposite to the force direction, and a magnitude of the counterforce is the same as the force magnitude, and wherein the counterforce overcomes a lunar gravity and drives a load to take off,
   wherein the medium is one or more of soil, gravel, moon rock, or moon water,
   wherein the medium accelerating module comprises a driving unit and a rotating unit, wherein the driving unit drives the rotating unit to rotate by using the power supply, so that the medium is transferred to the rotating unit where the medium is accelerated and ejected from the medium accelerating module, and
   wherein the driving unit is an electric motor or a motor and the rotating unit is a blade or an impeller.

2. The method of flying on the moon of claim 1, wherein the power supply is one or more of a generator, a storage battery, a remote energy transmission power supply, and a build-in nuclear battery.

3. The method of flying on the moon of claim 1, wherein the power supply is a solar power station on the moon which converts solar energy into electric energy, to supply power to the driving unit.

4. The method of flying on the moon of claim 1, wherein the medium is transferred to the medium accelerating module by transmission, vibration, or free fall.

5. The method of flying on the moon of claim 1, wherein the method further comprises:
   landing before the medium is exhausted; and
   taking off again after the medium is reloaded.

6. The method of flying on the moon of claim 1, wherein the medium accelerating module includes a driving unit and a rotating unit, the rotating unit having a diameter and a rotating speed, the rotating unit accelerating and ejecting the medium, the method further comprising:
   determining a massflow rate of the ejected medium, to determine a take-off weight.

7. A device for flying on a moon, comprising:
   a power supply;
   a medium accelerating module; and
   a medium storage unit, wherein, in an operating state, the power supply supplies electric power to the medium accelerating module, a medium is transferred from the medium storage unit to the medium accelerating module, the medium being one or more of soil, gravel, moon rock, or moon water, and is accelerated by the medium accelerating module and ejected out of the medium accelerating module in a force having a direction and a magnitude and without changing a state of the medium, to generate a counterforce having a direction opposite the force direction and a magnitude the same as the force magnitude, and wherein the counterforce overcomes a lunar gravity, so that the device for flying on the moon is driven to take off,
   wherein the medium accelerating module comprises a driving unit and a rotating unit, wherein the driving unit drives the rotating unit to rotate by using the power supply, so that the medium is transferred to the rotating unit where the medium is accelerated and ejected from the medium accelerating module, and
   wherein the driving unit is an electric motor or a motor and the rotating unit is a blade or an impeller.

8. The device for flying on the moon of claim 7, further comprising:
   an ejecting unit, wherein the medium is ejected out of the medium accelerating module through the ejecting unit.

9. The device for flying on the moon of claim 8, wherein the ejecting unit comprises a first ejecting unit and a second ejecting unit, a first counterforce generated by the medium accelerated and ejected out through the first ejecting unit overcomes the lunar gravity, and a second counterforce generated by the medium ejected out through the second ejecting unit controls a flight direction of the device for flying on the moon.

10. The device for flying on the moon of claim 9, wherein the first ejecting unit is disposed on a bottom of the device for flying on the moon, and the second ejecting unit is disposed on a side of the device for flying on the moon.

11. The device for flying on the moon of claim 7, wherein the power supply is a generator or a storage battery.

12. The device for flying on the moon of claim 11, wherein the generator converts solar energy into electric energy.

13. The device for flying on the moon of claim 11, wherein a solar panel is disposed on the device for flying on the moon, and the solar panel receives solar energy and converts the received solar energy into electric energy.

14. The device for flying on the moon of claim 11, wherein the storage battery is charged by solar energy through a solar power station on the moon, or through a solar panel provided on the device for flying on the moon.

15. The device for flying on the moon of claim 7, wherein the device for flying further comprises one or more of a detector, a transceiver, and a controller.

\* \* \* \* \*